(12) United States Patent
Huang

(10) Patent No.: US 7,973,641 B1
(45) Date of Patent: Jul. 5, 2011

(54) RFID BASED PARKING MANAGEMENT SYSTEM

(76) Inventor: Yuanlin Huang, Sterling, VA (US)

( * ) Notice: Subject to any disclaimer, the term of this patent is extended or adjusted under 35 U.S.C. 154(b) by 1035 days.

(21) Appl. No.: 11/808,098

(22) Filed: Jun. 6, 2007

Related U.S. Application Data

(60) Provisional application No. 60/811,424, filed on Jun. 7, 2006.

(51) Int. Cl.
*B60R 25/00* (2006.01)
(52) U.S. Cl. ............... 340/5.7; 340/10.1; 340/10.52; 340/539.1; 340/539.32
(58) Field of Classification Search ............... 340/5.7, 340/10.1, 10.52, 539.1, 539.32
See application file for complete search history.

(56) References Cited

U.S. PATENT DOCUMENTS

| | | | | |
|---|---|---|---|---|
| 4,325,146 | A * | 4/1982 | Lennington | 398/108 |
| 5,310,999 | A * | 5/1994 | Claus et al. | 235/384 |
| 5,414,624 | A * | 5/1995 | Anthonyson | 701/1 |
| 5,872,525 | A * | 2/1999 | Fukasawa et al. | 340/928 |
| 5,933,096 | A * | 8/1999 | Tsuda | 340/928 |
| 5,940,481 | A * | 8/1999 | Zeitman | 705/13 |
| 6,042,008 | A * | 3/2000 | Ando et al. | 235/384 |
| 6,501,391 | B1 * | 12/2002 | Racunas, Jr. | 340/932.2 |
| 6,535,143 | B1 * | 3/2003 | Miyamoto et al. | 340/933 |
| 6,823,317 | B1 * | 11/2004 | Ouimet et al. | 705/13 |
| 6,885,311 | B2 * | 4/2005 | Howard et al. | 340/932.2 |
| 7,084,767 | B2 * | 8/2006 | Hasegawa et al. | 340/572.1 |
| 7,181,426 | B2 * | 2/2007 | Dutta | 705/37 |
| 7,233,260 | B2 * | 6/2007 | Tang et al. | 340/928 |
| 7,427,928 | B2 * | 9/2008 | Crocker et al. | 340/902 |
| 7,707,113 | B1 * | 4/2010 | DiMartino et al. | 705/44 |
| 7,768,401 | B2 * | 8/2010 | Nagai et al. | 340/572.1 |
| 7,783,530 | B2 * | 8/2010 | Slemmer et al. | 705/28 |
| 2002/0089431 | A1 * | 7/2002 | Fuyama | 340/928 |
| 2002/0163443 | A1 * | 11/2002 | Stewart et al. | 340/932.2 |
| 2003/0144890 | A1 * | 7/2003 | Dan | 705/5 |
| 2004/0068433 | A1 * | 4/2004 | Chatterjee et al. | 705/13 |
| 2005/0033634 | A1 * | 2/2005 | Pugliese, III | 705/13 |
| 2005/0258935 | A1 * | 11/2005 | Hom et al. | 340/5.62 |
| 2005/0261945 | A1 * | 11/2005 | Mougin et al. | 705/5 |
| 2006/0001552 | A1 * | 1/2006 | Kojima | 340/928 |
| 2006/0082439 | A1 * | 4/2006 | Bazakos et al. | 340/5.82 |
| 2006/0145893 | A1 * | 7/2006 | Hassett | 340/928 |
| 2006/0253226 | A1 * | 11/2006 | Mendelson | 701/1 |
| 2007/0133756 | A1 * | 6/2007 | Graves et al. | 379/37 |
| 2007/0268140 | A1 * | 11/2007 | Tang et al. | 340/572.4 |

* cited by examiner

*Primary Examiner* — Benjamin C Lee
*Assistant Examiner* — Quang Pham
(74) *Attorney, Agent, or Firm* — Andrew Bodendorf

(57) ABSTRACT

An radio frequency identification (RFID) tag parking system to control a gate to allow a patron in a vehicle to enter and exit a parking facility without stopping, the system comprising: a first antenna for reading an RFID tag in a first area contained within a lane 215 associated with an entrance or an exit of the facility; a second antenna for reading the RFID tag in a second area, separate from the first area, contained within the lane 215 associated with the entrance or exit; an RFID reader 250 connected to the first and second antennae to read an identification (ID) associated with the RFID tag when the RFID tag passes through one of the first and second areas; and a processing device to determine that the read ID is valid and may access the facility and to control the gate to open. The system of claim 1 wherein the first and second antennae are sequentially activated as a vehicle enters the first area and the second area, respectively. The system also may include a registration unit 120, a payment unit, a driver information unit, and a reservation unit.

16 Claims, 12 Drawing Sheets

RFID BASED PARKING MANAGEMENT SYSTEM

PRIORITY

This application claims priority from U.S. Provisional Application No. 60/811,424, filed Jun. 7, 2006, and titled "RFID Parking Based Management," which is hereby incorporated by reference in its entirety for all purposes.

TECHNICAL FIELD

The following description relates generally to the parking management system. More specifically, the description relates to administering and managing a parking facility based on real time identification of vehicles with Radio Frequency Identification (RFID) technology.

BACKGROUND

As our social and economic activities progress, the administration and management of parking facilities are increasingly challenging. For example, university campuses and medical facilities assign various levels of parking privileges to students, faculty, patients, and doctors. Patrons of transit stations and airports demand fast and convenient access to and egress from parking facilities in downtown and other activity center situations. Drivers want to quickly find an available space even when traffic is congested. Parking operators want to maximize the revenue and utilization of the parking facilities.

Drivers at a typical university or medical parking facility are mostly regular patrons. Drivers at the facility purchase a permit and display the permit from a parking administrative office to display on their windshield. An entrance attendant visually inspects the permit and manually operates a gate to grant access to vehicles entering the facility. Some disadvantages of such a system include bottlenecks that may occur at entrances and exits at certain times of the day due to higher volumes of traffic (e.g., morning and evening peak hours). Furthermore, it is often difficult for attendants to quickly inspect permits for compliance with facilities having various levels of parking privileges.

Drivers at a typical airport or transit parking facility approach a gated entrance of the parking facility, stop their car, and take a magnetic ticket from a dispenser which causes the gate to open allowing the car to enter. The ticket may include a time and a gate entrance recorded on it. When leaving, the driver hands the magnetic ticket to an attendant to calculate parking fee, and pays with cash or a credit card. This system requires the driver to stop twice at the facility (to receive the ticket and pay for parking) which is, among other things, inconvenient to the driver and labor intensive.

Drivers at a typical downtown parking facility pay fees to attendants at the entrance or an exit. The entrance is blocked or a sign is displayed when the lot is full which has its disadvantages. For example, a driver en route to the facility has no way to know whether a parking space will be available upon reaching the parking facility. If the parking facility is full, the driver also has no way to determine which nearby parking facility has available spaces. As a result, the driver must continue to drive randomly around until a space is located. This is particularly frustrating to drivers on congested city streets.

Recently, RFID technology has started to be employed for use in parking facilities. One significant advantage of RFID systems is the potential expedience of hands-free use of the parking facility. However, many conventional implementations have used active RFID tags that have long read ranges and are therefore not suitable for parking management. For example, issues with RF signal interference caused by the long read ranges have resulted in problems for smooth facility operation. Other conventional implementations using passive RFID tags require a driver to stop near a sensor at a gate to read the RFID tag due to the limited ability of such systems to read data beyond short range.

Current systems of managing parking facilities are, among other things, inconvenient for drivers, expensive to operate, and underutilize the parking facility. Therefore, improvements continue to be developed for parking facility technology.

SUMMARY

In one general aspect, an radio frequency identification (RFID) based parking system to control each gate to allow a patron in a vehicle to enter and exit a parking facility without stopping includes a first antenna for reading an RFID tag in a first area contained within a lane associated with an entrance or an exit of the facility; a second antenna for reading the RFID tag in a second area, separate from the first area, contained within the lane associated with the entrance or exit; an RFID reader connected to the first and second antennae to read an identification (ID) associated with the RFID tag when the RFID tag passes through one of the first and second areas; and a processing device to determine that the read ID is valid and may access the facility and to control the gate to open. The first and second antennae may be sequentially activated as a vehicle enters the first area and the second area, respectively.

The system may further include: a first detector to detect a vehicle, and a second detector to detect the vehicle, where the RFID reader activates the first antenna to read the RFID tag in the first area when the vehicle is detected by the first detector; deactivates the first antenna and activates the second antenna to read the RFID tag in the second area when the vehicle is detected by the second detector. The first detector may be positioned in the lane approximately at an edge of the first area farthest from the gate, and the second detector may be positioned in the lane at an edge of the first area close to the gate. A third detector to detect a vehicle may be positioned in the lane after the gate where the RFID reader deactivates the second antenna and closes the gate when the vehicle is detected by the third detector. The primary antenna may be disposed above the lane and the first area may extend generally from the first detector to the second detector.

The primary antenna may be linearly polarized and the secondary antenna is circularly polarized.

The distance D in feet along a horizontal axis from the gate to an edge of the first area farthest from the gate is the sum of D1 the distance in feet along a horizontal axis from the gate to the second detector and D2 the distance in feet along the same horizontal axis from the second detector to the first doctor and D is expressed as: $D=D1+D2=2*MPH+(MPH)^2/5$ where MPH is the speed limit in miles per hour in the lane at the gate.

The RFID tag may be a passive RFID tag.

The system also may include one or more of: a registration unit to obtain information about a user of the parking facility for storage in a database corresponding to the ID associated with an RFID, a payment unit to receive payment with regard to an account associated with a specific RFID tag ID, a driver information unit to provide real time parking availability information of the parking facility. The driver information unit may include a remote interface to present the real time parking space availability information and other parking facility information. The remote interface may send the real time parking availability information to a remote processing device at specified times. The parking information may be a text message including the real time parking availability information.

The system also may include a reservation unit to reserve a parking space remotely before arriving at a facility. The reservation unit may provide a user interface to allow a user to check parking availability at the facility, to make payment, and to reserve a parking space. The reservation unit also may provide an online auction to receive bids for an available parking space and award the parking space to the highest bidder.

The system also may include a database in communication with the processing device to store information of a user associated with the RFID tag including real time transaction data.

Other features will be apparent from the description, the drawings, and the claims.

BRIEF DESCRIPTION OF THE DRAWINGS

Like reference symbols in the various drawings indicate like elements.

DETAILED DESCRIPTION

An RFID based parking management system with automated processes for parking management is described herein. The system may include an RFID unit, a registration unit, a payment unit, a driver information unit, a reservation unit, and a central database. The system and processes are described below by way of various examples with relation to FIGS. 1-12.

Figure 1:
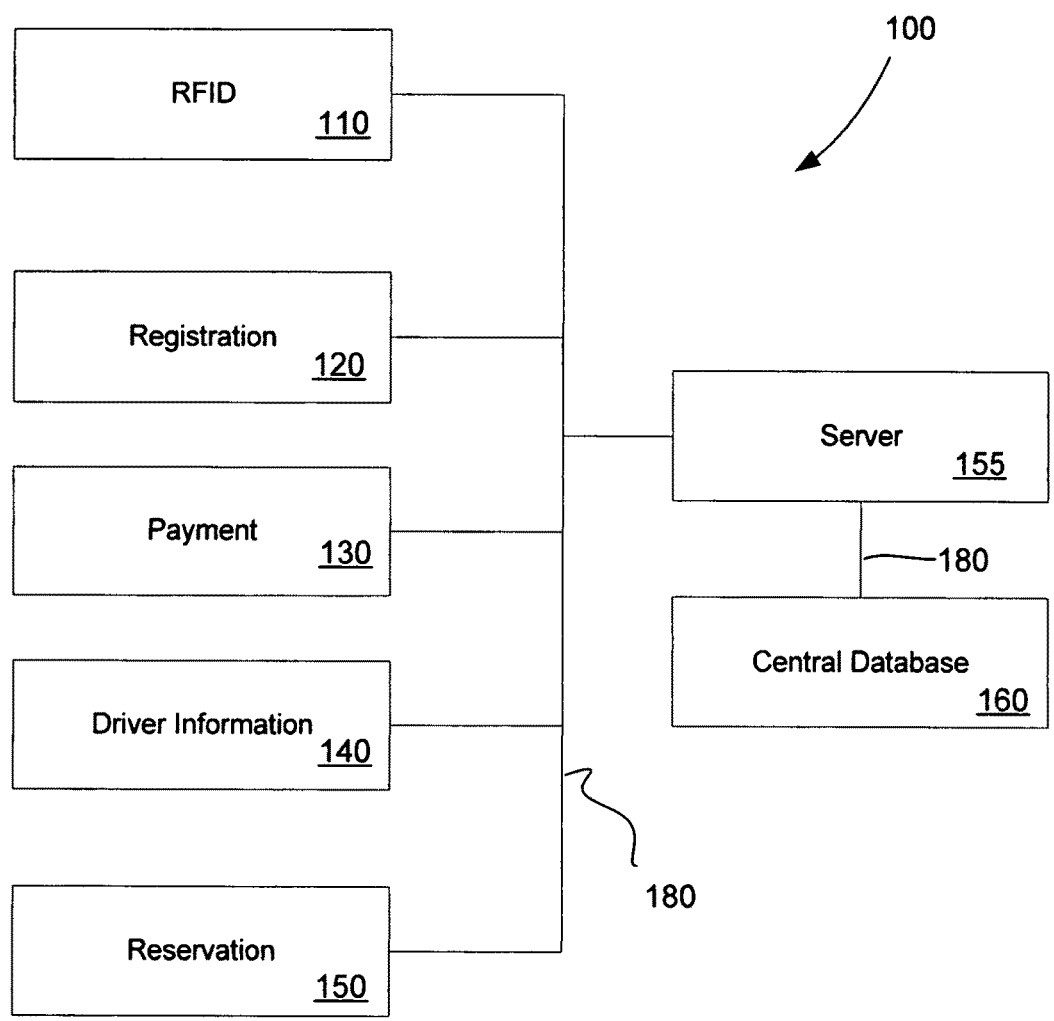
FIG. 1 is an exemplary block diagram illustrating an RFID system.

FIG. 1 illustrates one example of components for use in an RFID system 100 for parking management. The system 100 may include: an RFID unit 110; a registration unit 120; a payment unit 130; a driver information unit 140; a reservation unit 150; a server 155 and a central database unit 160.

The RFID unit 110, registration unit 120, payment unit 130, driver information unit 140, and reservation unit 150 may include a processing device, a storage device or memory, and/or a display. Other components also may be included, such as, for example, an I/O interface, a user interface, a speaker, and a communications device or bus. These components may be incorporated in a single device or housing or two or more of the components may be provided as separate devices, such as, for example, peripheral devices. Furthermore, although each of the units is shown by example in FIG. 1 as discrete units, it will be appreciated that two or more of these units may be combined as a single unit or between several units to suit a particular application and/or parking facility.

The processing device may be implemented using a general-purpose or a special purpose computer, such as, for example, a processor, a digital signal processor (DSP), a microcomputer, a field programmable array (FPGA), a programmable logic unit (PLU) or a microprocessor capable of responding to and executing instructions in a defined manner. The processing device may run one or more software applications including a user registration application to command and direct the processing device to add a new user to receive or process payments and accounts, dispense RFID tags, open and close gates at entrances, and communicate with other system devices and components as explained in greater detail below. The software applications may include a computer program, a piece of code, an instruction, or some combination thereof, for independently or collectively instructing the processing device to operate as desired. The processor also may access, store, manipulate, and create data in response to the applications.

The applications and data may be embodied permanently or temporarily in any type of machine, component, physical or virtual equipment, storage medium, or propagated signal wave capable of providing instructions or data to or being interpreted by the processing device. In particular, the applications or data may be stored by a storage medium or a memory including volatile and non-volatile memories (e.g., a read only memory (ROM), a random access memory (RAM), a flash memory, a floppy disk, a hard disk, a compact disk, a tape, a DROM, a flip-flop, a register, an SRAM, DRAM, PROM, EPROM, OPTROM, EEPROM, NOVRAM, or RAMBUS), such that if the memory is read or accessed by the processing device, the specified steps, processes, and/or instructions are performed and/or data is accessed or stored. The memory or unit may include an I/O interface, such that data and applications may be loaded and stored in the memory allowing the applications, programming, and data to be updated, changed, or augmented. The memory may be removable, such as, for example, a card, a stick, or a disk that is inserted in or removed from the unit.

The I/O interface may be provided to exchange data with the components of the system units or components using various communications paths 180. The interface may be implemented as part of the processing device or separately to allow the processing device to communicate with other devices, such as, for example, a memory device, a server, a network, the Internet, a mobile phone, a personal data assistant (PDA), a digital tablet/pad computer, a hand held computer, a personal computer, a notebook computer, a client device, and/or a workstation. The interface may include two or more interfaces, including interfaces for different types of hardware and for different types of communications media and protocols to translate information into a format that may be used by the processing device. Similarly, the interface may translate data/information received from the processing device to a format that may be transmitted to other devices and units of the system via a communications path 180. The interface allows the processing device to send and receive information using the communications paths 180.

The communications paths 180 may be configured to send and receive signals (e.g., electrical, electromagnetic, or optical) that convey or carry data streams representing various types of analog and/or digital data. For example, the communications paths 180 may be implemented using various communications media and one or more networks comprising one or more network devices (e.g., servers, routers, switches, hubs, repeaters, and storage devices). The one or more networks may include a LAN, a WAN, a plain old telephone service (POTS) network, a digital subscriber line (DSL) network, an integrated services digital network (ISDN), a synchronous optical network (SONNET), or a combination of two or more of these networks. In addition, the communications paths 180 may include one or more wireless links (e.g., cellular, mobile, GSM, TDMA, CDMA, and satellite) that transmit and receive electromagnetic signals, such as, for example, radio frequency, infrared, and microwave signals, to convey information.

For purposes of illustration, the RFID unit 110 may include an RFID tag that may be assigned to a vehicle and an RFID reading device, such as an RFID reader located at each entrance and/or exit gate of a parking facility. One or two antennae for each lane of an entrance and/or exit may be associated with the RFID reader. In one example, an RF signal interface and passive RFID tags may be used, although, active RFID tags also may be used. For hands-free access and egress from a parking facility, a single antenna may be used for each entrance and/or exit. However, two antennae may be used for access and egress without having the vehicle stop as explained in detail below. One of the antennae may be circularly polarized to read the RFID tags with various orientations. The other antenna may be linearly polarized, for example, to maximize the range at which an RFID tag may be read. A method to separate the RF signal of antenna by space and by sequencing is provided. Various examples of positioning, orientation, and processing of RFID data are given in greater detail below.

A parking permit with RFID tag may be obtained by registering a vehicle via the registration unit and paying a fee via the payment unit 130 the first time a user accesses the system. Thereafter, a user may check for availability of parking spaces using the driver information unit 140, and reserve a space using the reservation unit 150. When a user drives to the parking facility, the RFID unit 110 reads the RFID tag information from the vehicle, verifies the information with the central database 160 for payment and other parking policies, permits or denies access accordingly, and records the real time transaction and activity data at the central database 160.

The registration unit may be used to obtain information about vehicles and/or drivers that regularly use a parking facility. It also provides a means for entering administrative information, such as parking restrictions, privileges, and fees. The registration unit may include one or more workstations connected with a server 155 via a communications links, such as, a LAN or the Internet. The server 155 may be connected with a central database 160. In one example, various applications for the parking system may be web based and run by the server computer 155 to enable parking management personnel and/or customers to provide vehicle and driver information supplied by a workstation for storage in the central database 160. The vehicle information may include, for example, an ID associated with an RFID tag, a license plate, a make, a model, a color, a picture. The driver information may include, for example, a name, an address, a phone, an email, and a parking privilege (e.g., an employee may have the privilege to park for free or a professor may have the privilege to park in more desirable parking facility than a student). The vehicle and driver information may be stored in connection with an account maintained in the central database 160. Although server 155 is represented as a single server, one will appreciate that two or more severs may be employed in order to handle the demand associated with any particular application.

The payment unit 130 allows drivers to make payment remotely or at a payment station with regard to each account associated with a specific RFID tag ID. Payments may be made in a number of different ways. For example, a driver may prepay or deposit funds within an account; the parking fee is automatically deducted from the account for each use. The payment station may be located within a parking facility which may reduce and/or eliminate the need for attendants at the parking facility.

The driver information unit 140 provides real time parking availability information to drivers who may use the parking facility. In one example, the driver information unit 140 may be implemented using a display located outside the parking facility to present the real time availability of parking spaces. The display device may connect with a control station via a communications path. In another implementation, the driver information unit 140 may include a website or other remote interface to present real time parking space availability and other parking facility information. The interface also allows drivers to schedule parking information to be sent to a mobile phone, a pager, or an email account at specified times. In yet another embodiment, the driver information unit 140 may run an application to provide a text messaging service that sends real time parking availability information to driver's cell phone, PDA, computer, or other device on demand. For example, parking information may be scheduled to be sent to a mobile phone in the morning before a driver leaves a residence. The parking availability information may include, for example, a number of spaces that are available or specific spaces that are available in a parking facility or zones of a facility. For example, a zone may be an area within a parking facility, such as one floor on a multi-floor parking facility. The driver information unit 140 reduces and/or eliminates the need for drivers to search for spaces.

The reservation unit 150 allows drivers to reserve parking spaces remotely before arriving at a facility. The reservation unit 150 includes an application to access or communicate with the driver information unit 140 to check for availability of spaces at the facility and the payment unit 130 to receive electronic payment or check funds with an account. In one example, the server 155 provides an Internet web site and/or a text messaging service as described above. A driver may check parking availability, make payment, and reserve a parking space via an Internet web-site or via a user or mobile device, such as a cell phone providing convenience for drivers in areas with a shortage of parking spaces.

Figure 2:
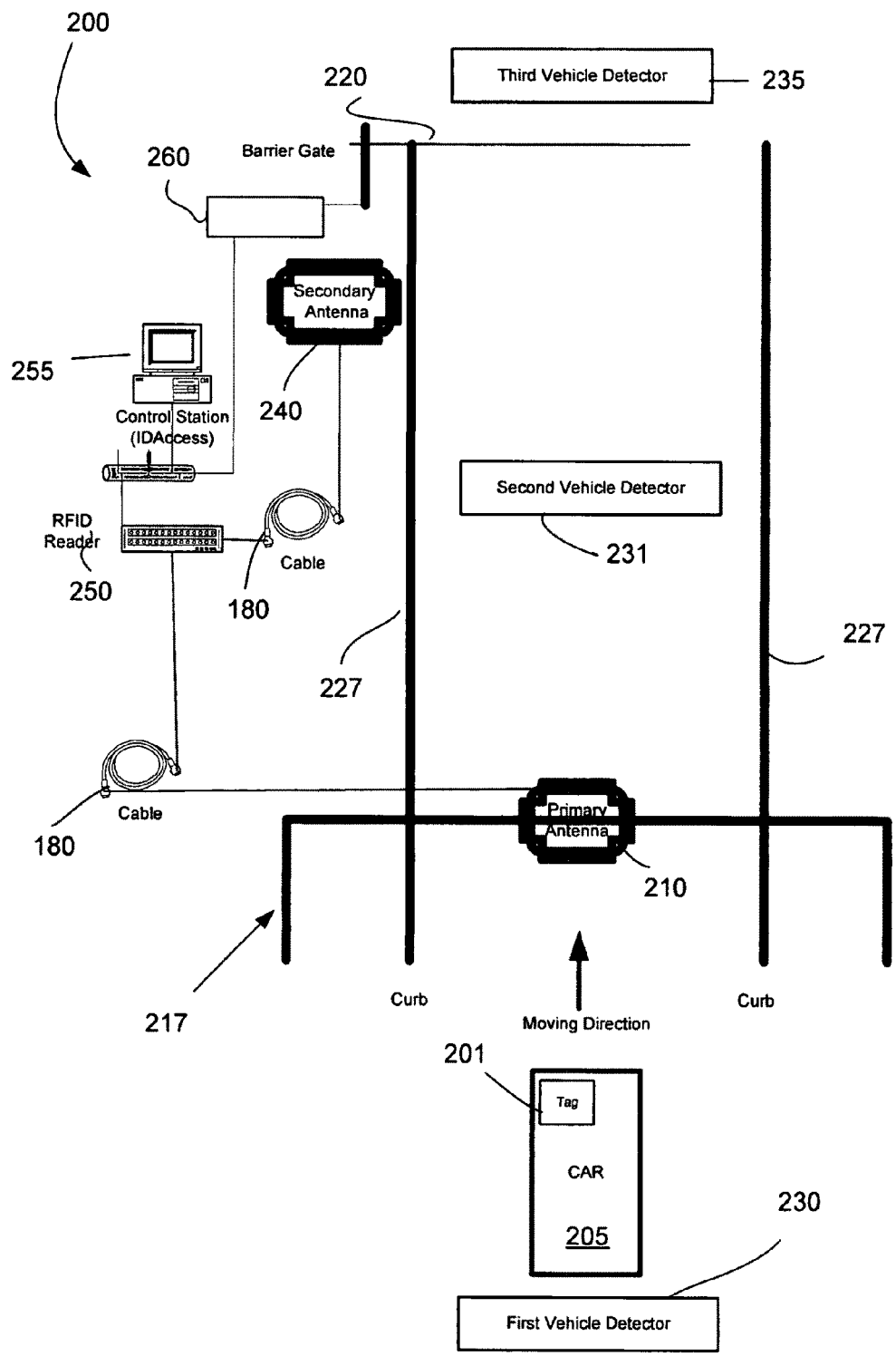
FIG. 2 is an exemplary schematic diagram illustrating an RFID unit with two antennae for use in the system of FIG. 1.

FIG. 2 shows one exemplary schematic diagram 200 for implantation of the RFID unit 110 of FIG. 1. An RFID tag 201 is placed somewhere on each vehicle 205 (e.g., on a windshield of the vehicle). A primary antenna 210 may be positioned proximately to the lane 215 at the entrance or exit of the parking facility. In one example, the primary antenna 210 may be mounted on a frame 217 above the lane with a gate 220 at the entrance or exit. The lane may be bounded by an indication 227 (e.g., lines or curbs). In addition, three vehicle detectors 230, 231, 235 may be placed in the lane 215 between the boundaries 227. The vehicle detectors 230, 231, 235 are explained in more detail below with regard to various embodiments of the invention.

A secondary antenna 240 may be mounted near the gate 220 (e.g., on the driver side of a curb). An RFID reader 250 may be connected to the antennae 210, 240, a control station 255, and a gate control device 260. In one example, the antennae 210, 240 may be connected to the RFID reader 250 via a communications path 180 (e.g., coaxial cables). The RFID reader 250 and the control station 255 may be connected to a network or connected to each other directly via a communications path (e.g., using RJ45 Ethernet cable). The RFID reader 250 communicates using digital I/O signals. In one example, the reader may be implemented using a commercially available RFID reader 250, such as; for example, SAMSys UHF MP9320 RFID reader. In one example, the RFID tag 201 may be implemented using a commercially available tag, such as, for example, a Rafsec frog RFID tag. The gate control device 260 may be implemented using a programmable logic unit (PLU) connected to the control station via a RJ45 cable.

As a registered vehicle 205 approaches the gate 220 of the parking facility, the RFID reader 250 via the primary antenna 210 attempts to read the RFID tag 201. If the RFID tag is successfully read, the control station accesses a central database 160 to retrieve any necessary information using an ID that is determined from data read from the RFID tag 201. The control station 255 processes the ID to determine whether the vehicle 205 should be granted access to the facility. If access is granted, the control station 255 causes the gate controller 260 to open the gate 220 using a control signal sent to the gate controller 260 and/or via the RFID reader 250 allowing the driver to pass through the gate 220 without stopping the vehicle 205. In the event the RFID reader 250 is not able to determine an ID from the RFID tag 201 using the primary antenna 210, the driver may continue slowly toward the secondary antenna 240, and stop if necessary, to allow reading of the RFID tag 201 to ensure the RFID tag is successfully read. The control station 255 processes the ID read from the tag to control the gate controller 260 as described above.

Figure 3:
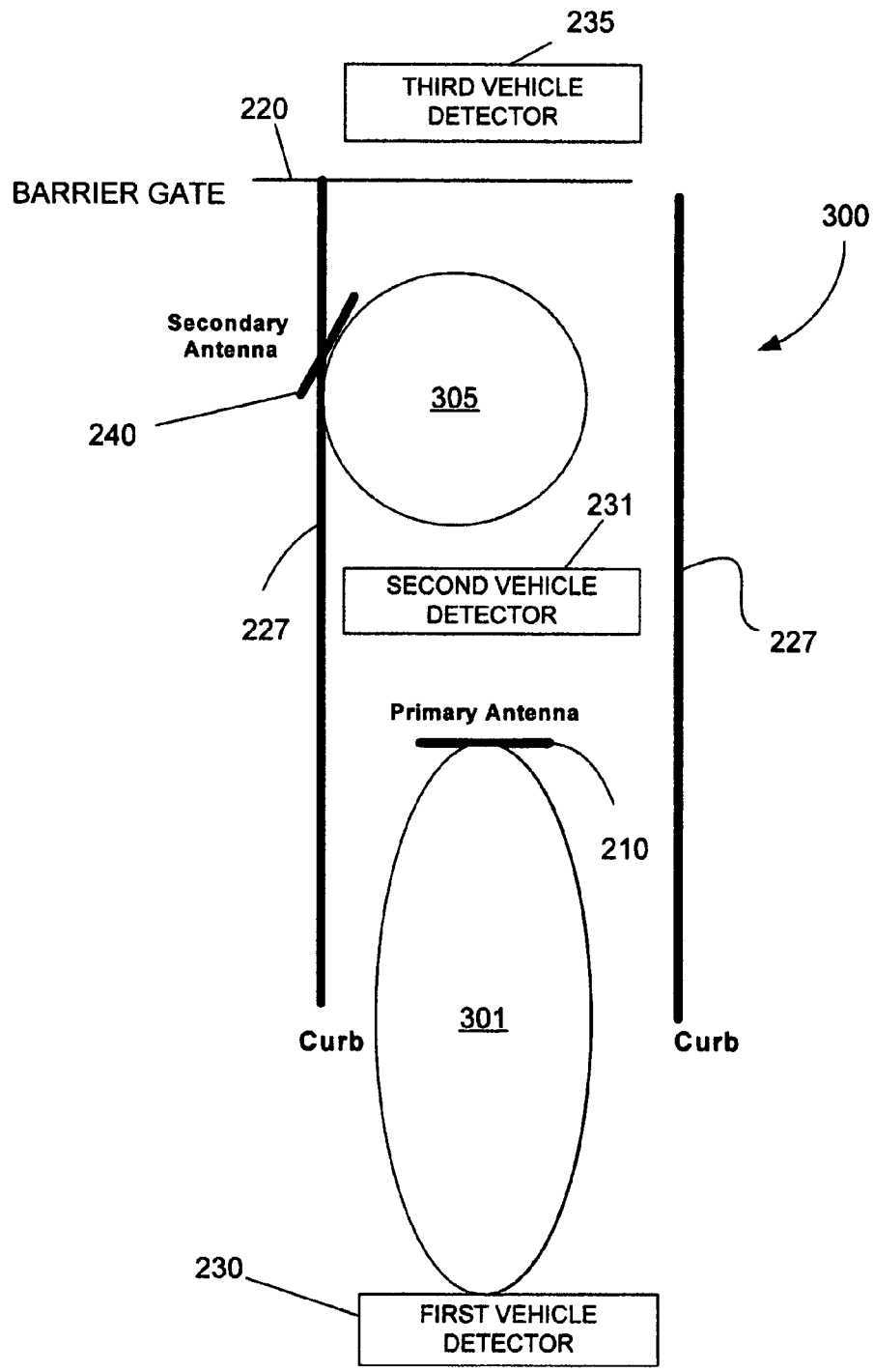
FIG. 3 shows an example of spatial positions of the two antennae for use with the unit of FIG. 2.

In conventional RFID parking systems, RF signal interference compromises reliability of reading the RFID tag. According to one embodiment described herein, the RFID system separates the RF signals by space as illustrated in FIG. 3. FIG. 3 shows a deployment 300 of the fields 301 and 305 associated with RF signals of the primary and secondary antennae 210, 240, respectively. The fields 301 and 305 have areas that are limited within the lane 215. As a result of this deployment, the signals from the antennae avoid energizing and reading the RFID tag of a vehicle that may be located in an adjacent lane. This arrangement physically separates the RF signals of the antennae in each lane from interfering with signals in adjacent lanes. Separating the signals by lane prevents the system from accidentally opening the gate of an adjacent lane, as occurs in some conventional systems.

In addition to separating the signal fields 301 and 305 by space between lanes, FIG. 3 also shows that the RF signals of the primary and secondary antennae 210, 240 within the same lane 215 also are spatially separated from each other. According to this embodiment, a primary vehicle detector 230 may be located in the lane 215 before the vehicle reaches the primary antenna 210. A secondary vehicle detector 231 may be positioned before the secondary antenna 240. A third vehicle detector 235 may be located in the lane 215 behind the gate 220. The vehicles detectors 230, 231, 235 may be implemented, for example, using any commercially available vehicle detector, such as a loop detector, connected to the RFID reader 250 and/or control station 255 to activate and deactivate the primary and secondary antennae 210, 240 based on detection signals supplied by the detectors 230, 231, 235. Once a vehicle 205 is detected by the primary detector 230, the primary antenna 210 is activated. After the vehicle passes the second detector 231, the primary antenna 210 is deactivated and the secondary antenna 240 is activated. After the vehicle passes the third detector 235, the gate 220 is closed and the secondary antenna 240 is deactivated. In this way the antennae 210, 240 are sequentially activated and deactivated to ensure that a vehicle trailing a preceding vehicle does not open the gate for the preceding vehicle (a common problem of most conventional systems).

Figure 4:
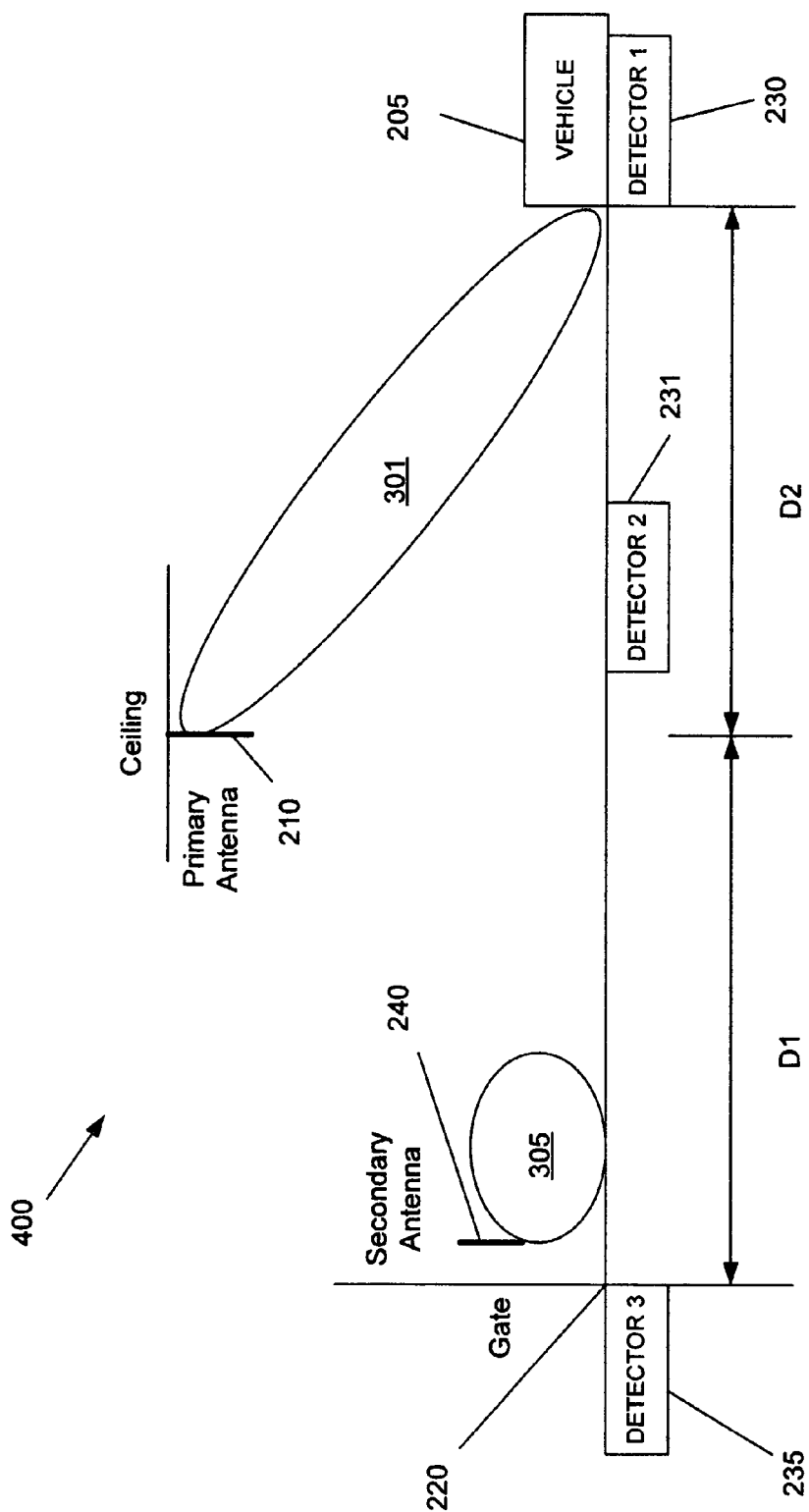
FIG. 4 shows another example of the spatial positions of the two antennae for use with the unit of FIG. 2.

FIG. 4 shows a schematic diagram 400 of the relative positioning of the vehicle detectors 230, 231, 235, antennae 210, 240, and the gate 220 in a plane defined by a horizontal and vertical axis. In this exemplary arrangement, the field 301 associated with the primary antenna 210 is longer than the field 305 associated with the secondary antenna 240. In addition, the first antenna 210 is positioned above the lane 215 such that the field 301 is projected downward at an angle from the first antenna 210 to the ground approximately at the first vehicle detector 230. As a result, the RFID tag in a vehicle will pass somewhere through the field after being detected by the first vehicle detector 230 when approaching the facility entrance or exit. When a vehicle 205 approaches the gate 220, the first vehicle detector 230 is triggered and the primary antenna 210 is activated. Once the primary antenna 210 is activated, the RFID reader reads the RFID tag of the vehicle 205 to open the gate in a short period of time (e.g., a fraction of a second to a few seconds). If the vehicle passes the second detector 231 and the RFID tag has not successfully been read, a signal may be presented to the driver to indicate to the driver that the primary antenna 210 has failed to read the tag (e.g., an illuminated light, display, sign, and/or audio alarm). The vehicle 205 travels a distance d2 from the time it passes the first detector and the time the driver realizes the first antenna failed to read the tag. The vehicle 205 may safely slow down and/or stop in front of the gate near the secondary antenna 240 at a distance of d1. If the gate 220 is not open due to read failure, driver will have enough time to brake and stop in front of the gate 220. The combined distance D of distance of d1 and d2 may be expressed as:

$$D = d1 + d2 = 2*MPH + (MPH)^2/5$$

Where:

d1 is the distance (in feet) for the driver to stop in front of the gate after being signaled that the primary antenna 210 has failed to read the tag;

d2 is the distance (in feet) from the first detector 230 to the point the driver after being signaled that the primary antenna 210 failed to read the tag 201;

D is distance (in feet) from the first detector 230 to the gate 220; and

MPH is the speed limit in miles per hour at the gate.

For example, if the speed limit is 5 MPH, then D=2*5+ 5*5/5=15 feet. To maximize the incidence of passing the gate without stopping of the vehicle, the primary antenna 210 may be positioned such that the RFID tag on vehicle may be read 15 feet from the gate. Similarly, if the speed limit is 10 MPH, then D=2*10+10*10/5=40 feet. To maximize the incidence of passing the gate without stopping, the primary antenna 210 may be positioned such that the RFID tag on vehicle may be read 40 feet from the gate.

Figure 5:
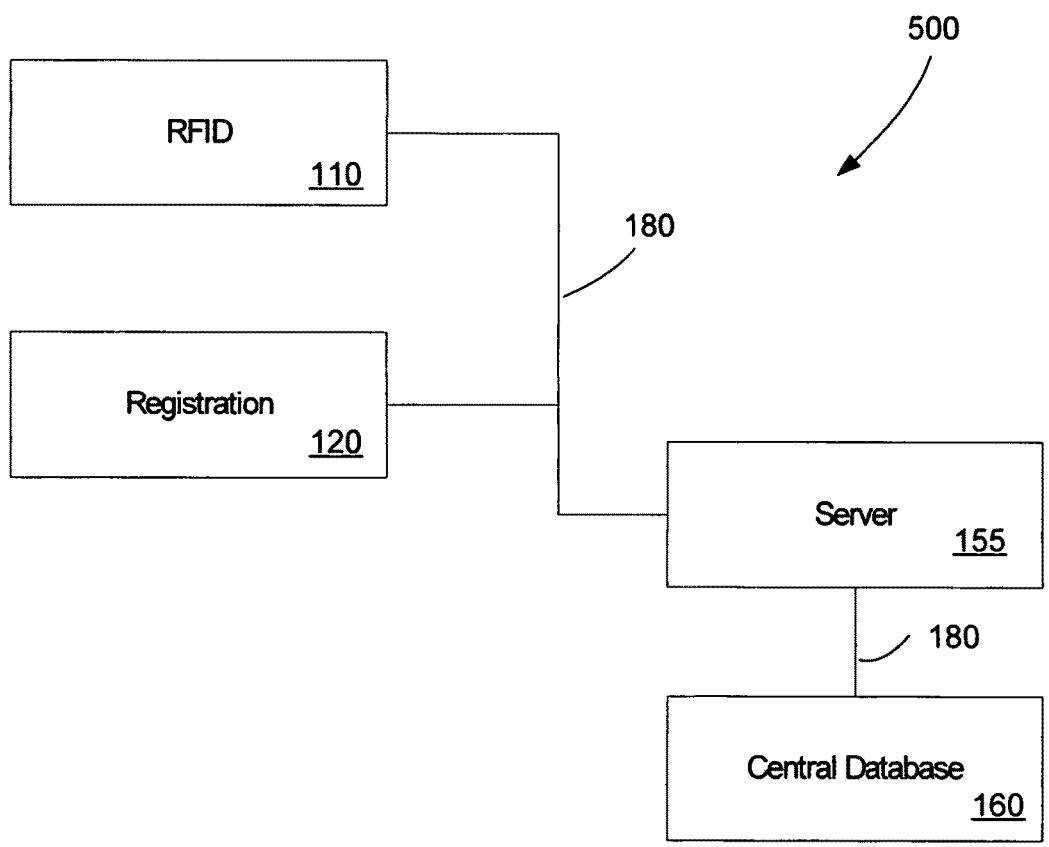
FIG. 5 is an exemplary block diagram illustrating an RFID system for internal free parking.

FIG. 5 shows a logic diagram of a system 500 to implement internal free parking. The system may include: an RFID unit 110; a registration unit 120; and a central database 160 unit 160. The RFID unit 110 may include a control station which may be connected to an RFID reader 250 and a server computer 155. The RFID reader 250 may be connected to two antennae 210, 240 through which the RFID tag 201 of a vehicle 205 is read. The control station 255 may command the RFID reader 250 to send a digital signal to open and close gate 220. The system 500 also may include one or more computers running registration software to enter registration information. In one example, the registration software is a web-based application hosted by the server computer 155 providing an interface for a browser application used to enter the registration information. The registration information may include, for example, vehicle information, owner contact information, and owner parking privileges. The central database 160 may store the data, including the registration information for the parking management system. The central database 160 may be used to manage more than one parking facility. After a user registers, an ID and associated RFID tag is issued to the user in person or by mail for placement in a vehicle to use in one, several, and/or all of the parking facilities managed by the system 500. According to this implementation 500, user may park without collecting any payments.

Figure 6:
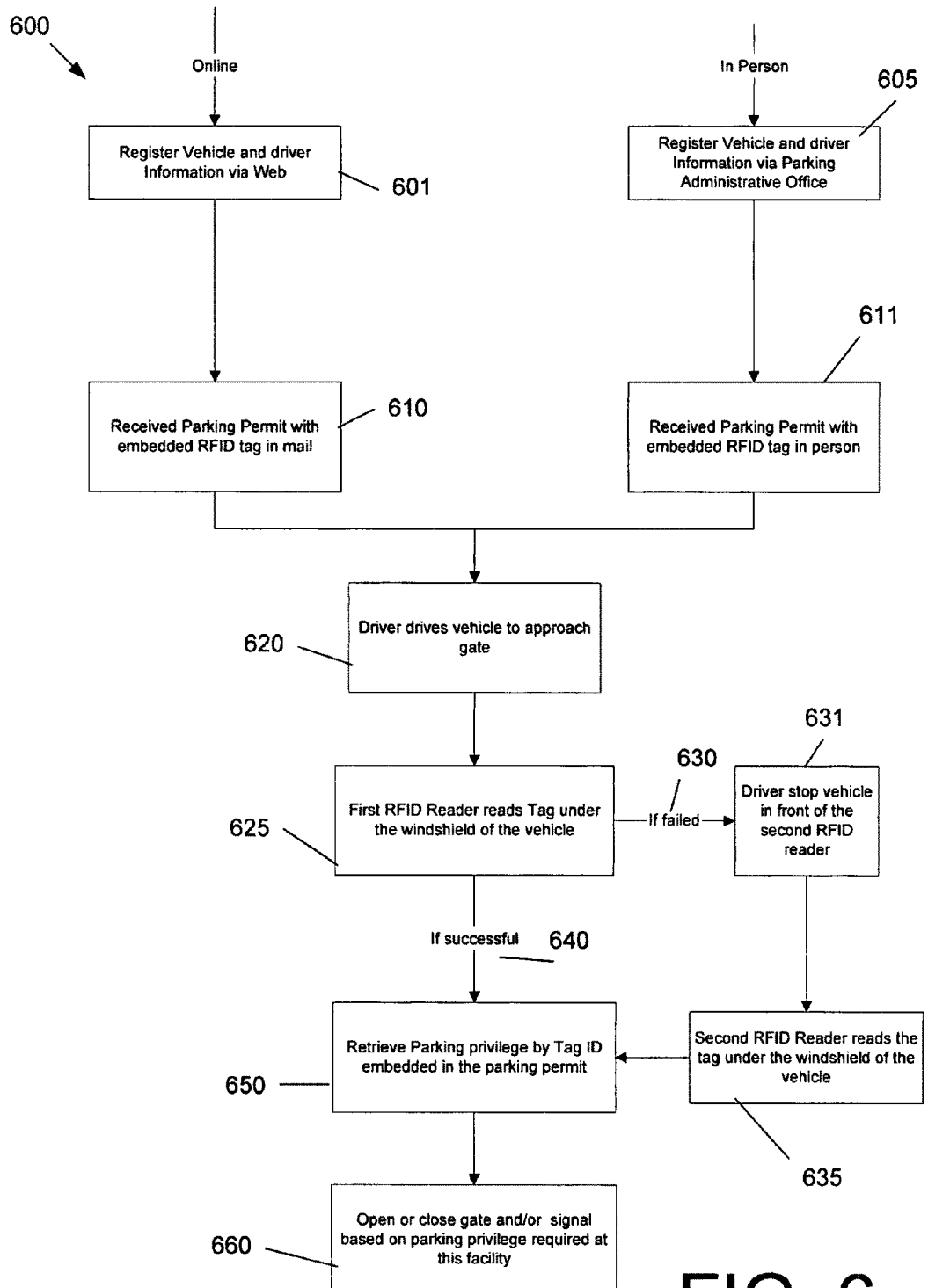
FIG. 6 is an exemplary process for use with the system of FIG. 5.

FIG. 6 shows a workflow diagram 600 for use in the internal free parking system 500 of FIG. 5. A driver registers a vehicle to use a parking facility either remotely 601 (e.g., online) or in person at a parking administrative office 605. During registration, vehicle and/or user information is stored in the central database 160, and an RFID tag is assigned to the vehicle. Thereafter, all information associated with the vehicle, for example, registration information and real time transactions associated with the vehicle stored in the database 160 are identified using the RFID tag ID. Users registered online receive a parking permit with an embedded RFID tag by mail. Whereas uses who register in person receive the permit with embedded RFID onsite 611. The permit may be placed, for example, under the windshield of a vehicle.

When the vehicle approaches the gate of the parking facility 620, the first antenna attempts to read the RFID tag without the vehicle having to stop 625. If the first antenna fails to read the RFID tag 630, the vehicle may slow down or stop 631 before the gate allowing the second antenna to read the RFID tag 635. Once the RFID tag is read 640, the control station sends the ID associated with the RFID tag to the server. The server retrieves the vehicle specific information associated with the ID, as well as any generic information, such as parking policy and/or restrictions from the central database 650. The retrieved information is processed by the server computer which determines whether to deny or grant access. The determination is sent to the control station. Alternatively, the information may be sent to the control station for a determination of whether to grant or deny access. If the tag ID is associated with a valid registered vehicle with proper parking privilege, the control station commands the gate to open 655. Otherwise, the gate remains closed and access is denied. The gate is closed after the vehicle passes the vehicle sensor located behind the gate.

Figure 7:
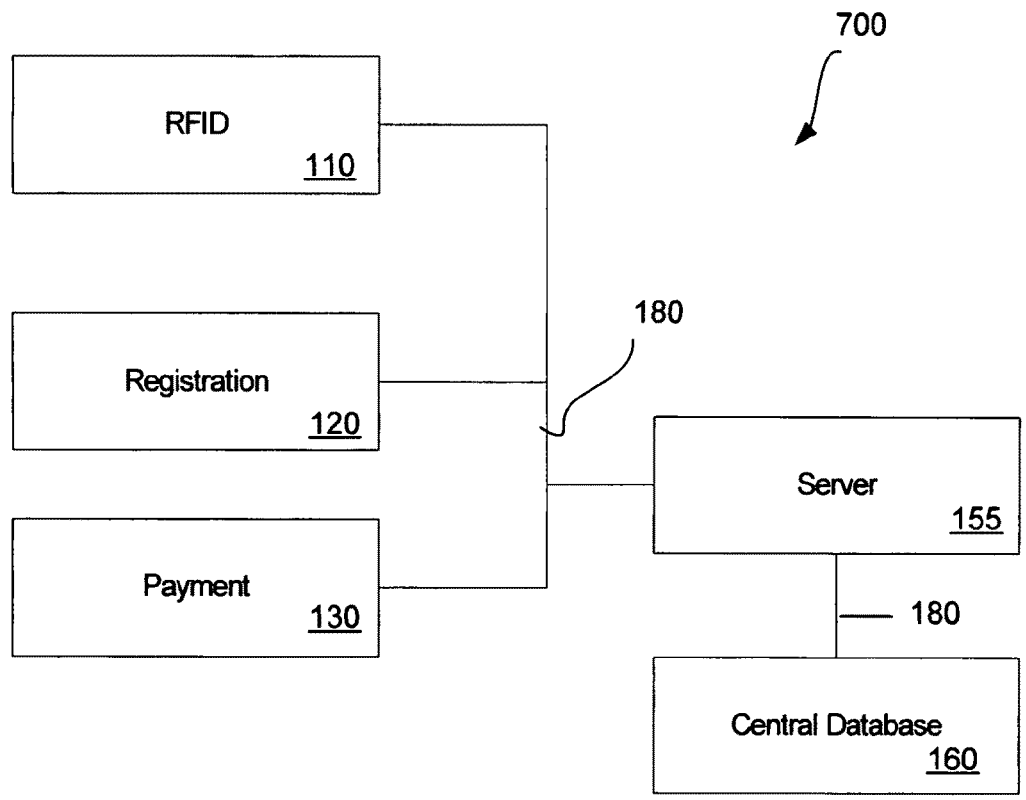
FIG. 7 is an exemplary block diagram illustrating an RFID system for internal paid parking.

FIG. 7 shows a block diagram of a system 700 providing internal paid parking. The system 700 includes: an RFID unit 110; a registration unit 120; a payment unit 130; and a central database 160. The RFID unit 110, the registration unit 120, and the central database 160 may be implemented as described above. The payment unit 130 may be used to manage payment of fees for an account associated with the ID of an RFID tag and corresponding vehicle registered in the central database 160. Money may be deposited in this account via, for example, the Internet or a payment station (e.g., a kiosk) at the parking facility. The account is updated with the real time parking gate transactions for each use of the parking facility. Whenever a registered vehicle uses the parking facility, a fee may be automatically deducted from the associated account. Fees may be charged in any number of different ways, such as per use or per time period, such as, for example, an hour (or fraction thereof), a day, a month, or a year, or other time period.

Figure 8:
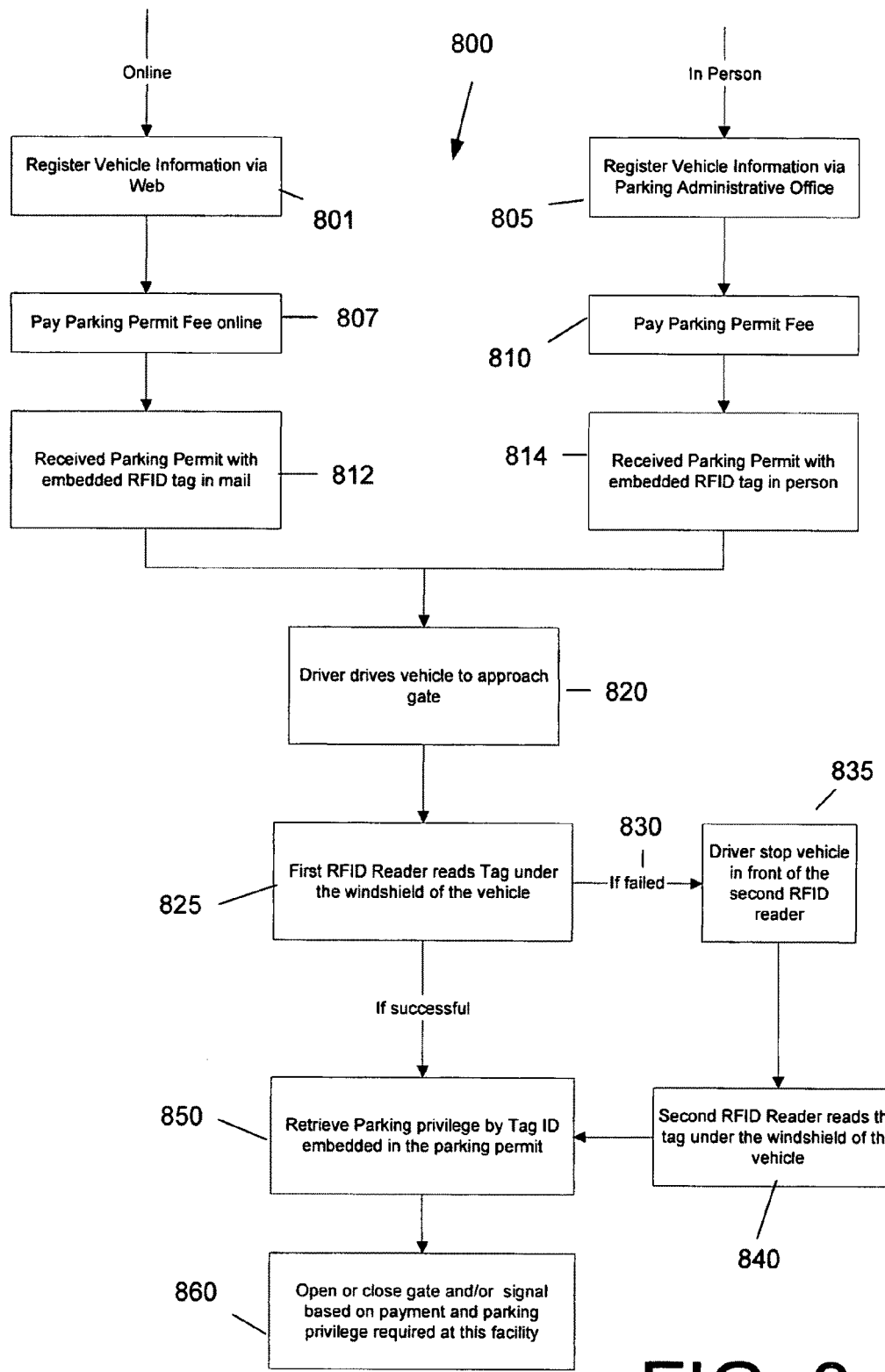
FIG. 8 is an exemplary process for use with the system of FIG. 7.

FIG. 8 shows workflow diagram 800 for internal paid parking for use with the system of FIG. 7. To use the parking facility, a driver registers a vehicle either online 801 or in person at the facility 805. The vehicle and driver information is gathered during the registration and stored in the central database. An RFID tag parking permit is assigned for the vehicle once the information has been obtained. The user pays for the RFID parking permit or privilege associated with the RFID tag using the payment unit 130 remotely 807 or in person 810. Once the RFID tag has been assigned, all information, such as, registration information, payment information, and real time transactions from use of the facility is stored in the database 160 in reference to the ID associated with the RFID tag. If the user registers online, a parking permit with an RFID tag embedded therein is mailed to the user 812. If the user registers in person, the user receives the permit from the onsite administration personnel 814. Alternatively, the permit may be distributed by a kiosk or other payment unit onsite upon entry of the information and receipt of payment. The permit may be placed on the vehicle, for example, under the windshield of the vehicle. When the vehicle approaches the entrance of the parking facility 820, the first antenna attempts to read the RFID tag without the vehicle having to stop 825. If the first antenna is unable to read the RFID tag 830, the vehicle may slow or stop before the gate 835 to allow the second antenna to read the RFID tag on the vehicle 840.

Once the RFID tag is read by the first or second antennae, an associated ID is determined by the control station from the information/data stored in the RFID tag. The control station sends the determined ID to the server computer. The server computer retrieves the vehicle specific information, such as vehicle and payment information, as well as generic information, such as parking policy and restrictions, from the central database. The retrieved information is processed by the server computer. The server computer determines if the ID is associated with a registered vehicle in the central database and that an account associated with the ID has a proper status (e.g., the account has a sufficient balance for a per usage fee or the permit is paid up and/or within a billing period). In addition, the server computer also may determine whether the permit and/or account have an associated privilege to use the parking facility 850. If it determined access to the parking facility should be granted, the server instructs the control station to open the gate via the gate controller 860, otherwise access is denied. After the vehicle passes the vehicle sensor behind the gate, a signal is sent to the control station to close the gate.

Figure 9:
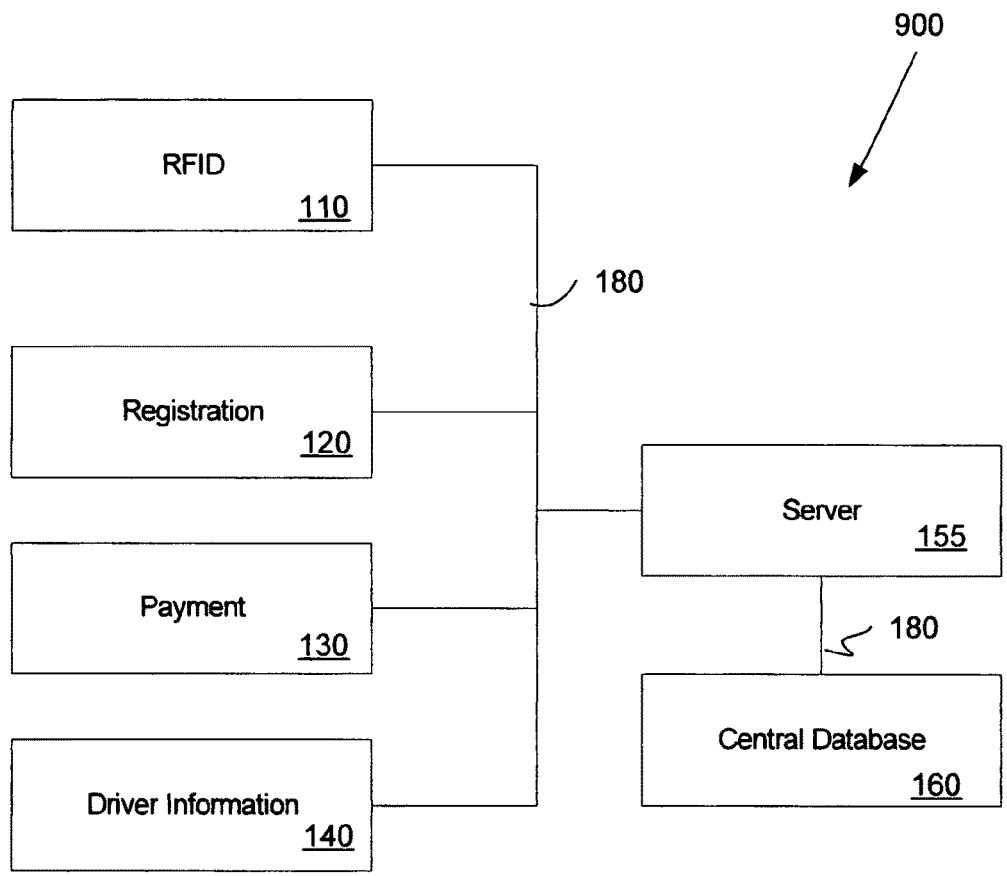
FIG. 9 is an exemplary block diagram illustrating an RFID system for public parking.

FIG. 9 shows a block diagram of the components of a system 900 for public parking by first time patrons. The system 900 includes: an RFID unit 110; a registration unit 120; a payment unit 130; a central database 160; and a driver information unit 140. The RFID unit 110; the registration unit; the payment unit 130; and the central database 160 may be implemented as described above The driver information unit 140 may access and present real time parking availability based on data stored in the central database 160 that is updated in real time by the RFID unit 110. The driver information unit 140 may include a software application hosted by the server computer 155, and a user interface on the client side to present parking space availability to a user. The user interface may be implemented at the facility. In addition, the user interface may be provided on another platform, such as a mobile device or computer. The mobile device, for example, could be a cell phone, a PDA, or an in-vehicle navigational device. In one example, the user interface may include a display. The display may be implemented outside of the parking facility as a large LED display or by a browser or mini-browser on a computer or mobile device. According to this embodiment, the central database 160 stores information for all valid tags that are to be used at the parking facility. Before arriving at the facility, a user may check the availability of parking at the facility using a remote connection (e.g., via the Internet or a cell phone). In one example, the user may create a profile using the user interface (e.g., using a web browser displaying a webpage via the Internet) and have the parking availability information delivered by any of a number of different media, such as cell phone or email at specified time for one or more specified, desired facilities.

Figure 10:
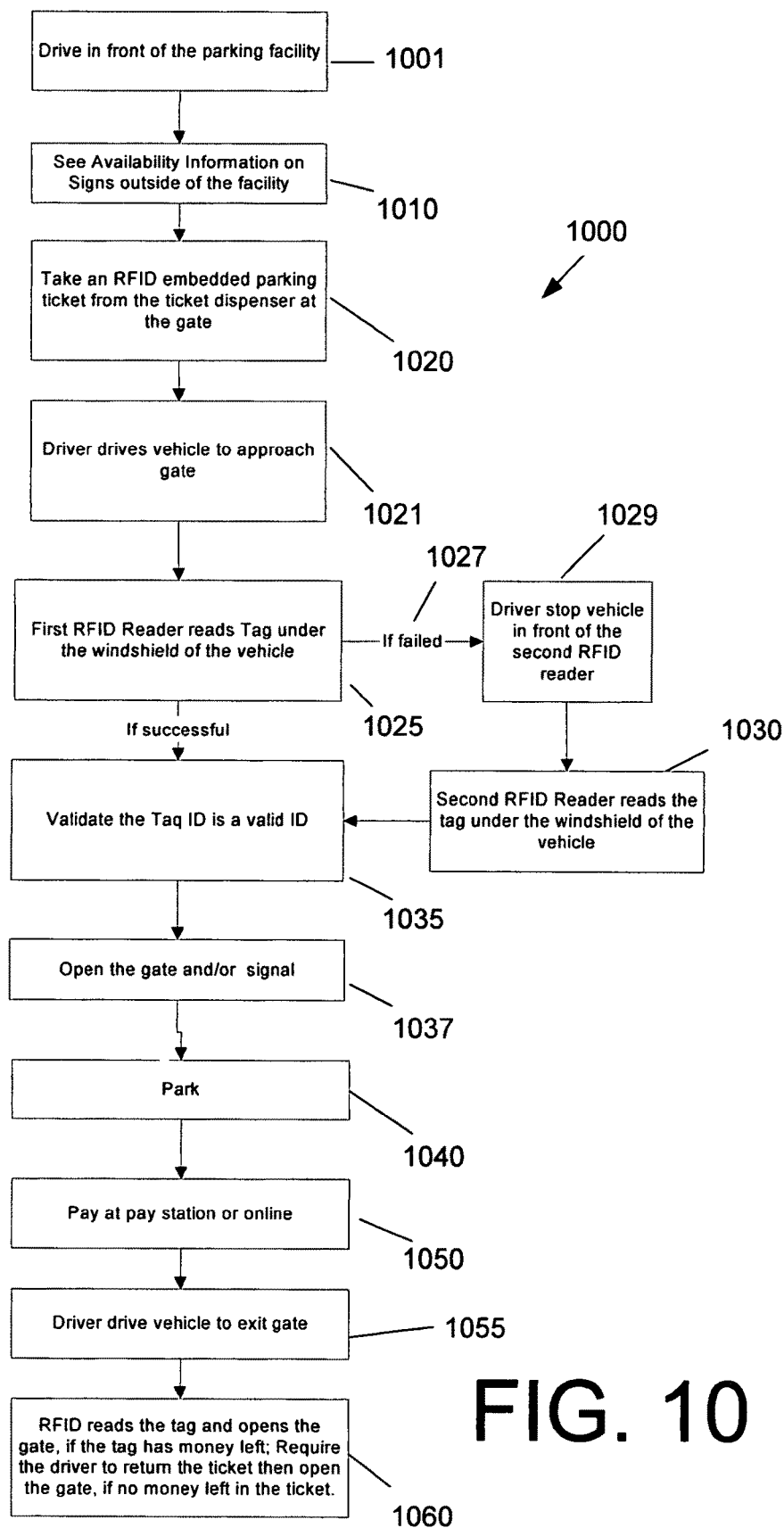
FIG. 10 is an exemplary process for use with the system of FIG. 9.

FIG. 10 shows a workflow diagram 1000 for public parking by first time patrons for use with the system 900 of FIG. 9. The user may drive to the parking facility 1001 and view a display outside the facility for real time parking availability information for the facility 1010. If there are available spaces, the user takes an RFID embedded parking ticket from the RFID tag ticket dispenser at the entrance of the parking facility 1020. The user places the RFID tag ticket in the vehicle, for example, on the dashboard of the vehicle and proceeds toward the gate 1021.

The primary antenna 210 attempts to read the ID from the RFID tag in the vehicle 1025. If the primary antenna 210 fails to read the RFID tag 1027, the vehicle may slow and/or stop before the gate 1029 to allow the secondary antenna to read the RFID tag 1030. The data read from the RFID tag is supplied to RFID reader to determine the ID associated with the RFID tag. The determined ID is supplied to the control station which sends the ID to the server computer to check whether the ID is stored in the central database and valid. If the server determines the ID is valid 1035, the server instructs the control station to command to gate controller to open the gate 1037. An account associated with the ID associated with RFID tag also may be created in the central database.

The driver may proceed to find a space and park the vehicle 1040. Once parked, the user makes a payment to the account associated with the ID using a pay station at the parking facility before leaving the parking facility 1050. In another example, the user may pay using a remote connection, such as a browser connected to the user interface supplied with a website or through use of a phone line. Once paid, the user may drive the vehicle to the exit 1055. As the vehicle approaches the exit, a primary antenna attempts to read the ID associated with the RFID in his vehicle. If the primary antenna is unable to read the RFID tag, the vehicle may slow and/or stop before the exit gate to allow the secondary antenna to read the RFID tag. Once the ID is determined, the reader supplies the determined ID to the control station. The control station sends the ID to the server computer to access the payment system. The payment system may automatically deduct the fee associated with parking at the facility from the account associated with the ID. If the account has sufficient funds, the server instructs the control station to command the gate controller to open the gate and let the vehicle exit without stopping. The driver may use the same tag upon visiting the facility in the future (without having to receive a newly dispensed RFID tag). If it is determined that the account has insufficient funds, the driver may be asked to return the tag for reuse and the gate is then opened 1060.

Figure 11:
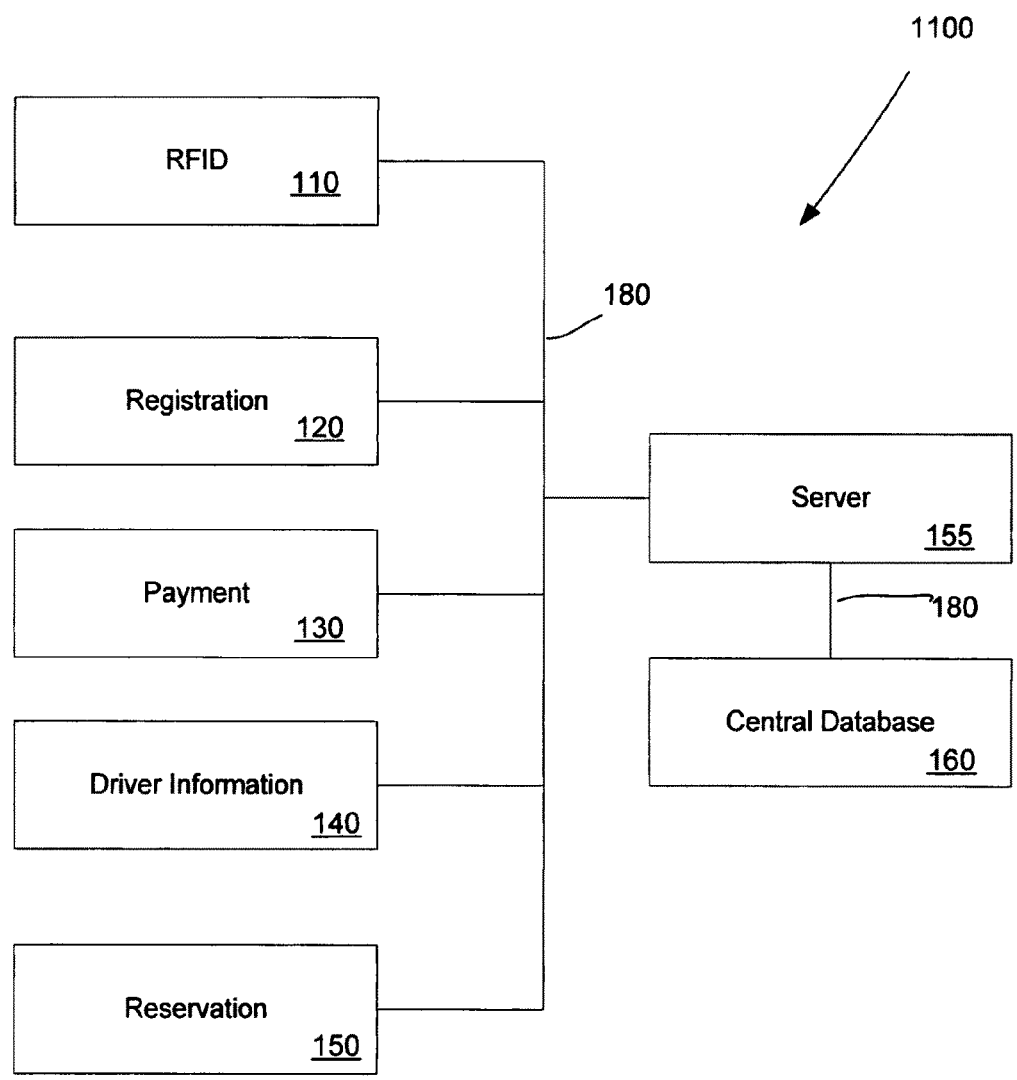
FIG. 11 is an exemplary block diagram illustrating system for public parking with regular patrons.

FIG. 11 shows a block diagram of the components of a system 1100 for public parking by returning patrons. The system 1100 includes: an RFID unit 110; a registration unit 120; a payment unit 130; a central database 160; a driver information unit 140; and a reservation unit 150. The RFID unit 110; the registration unit 120; the payment unit 130; the central database 160, and the driver information unit 140 may be implemented as described above. The reservation unit 150 may be connected to or accessed by the driver information unit 140 to allow the driver to check parking availability before reservation, connect to the payment unit 130 to pay, and connect to the central database 160 to update parking availability. A software application of the reservation unit 150 may be hosted on a server computer 155. The reservation unit 150 may include a client side application to present a user interface to the driver. The user interface may be implemented on one or more computers allowing a driver to reserve parking spaces. The driver also may reserve a parking space via a mobile communications device, such as a PDA, a cell phone, a navigational device, or a laptop or microcomputer. In addition, data entry device, such as a keypad, is located at each gate of the facility and connected to the control station via a communications path, such as a serial port. The data entry device may be used by a driver to enter a reservation number.

Figure 12:
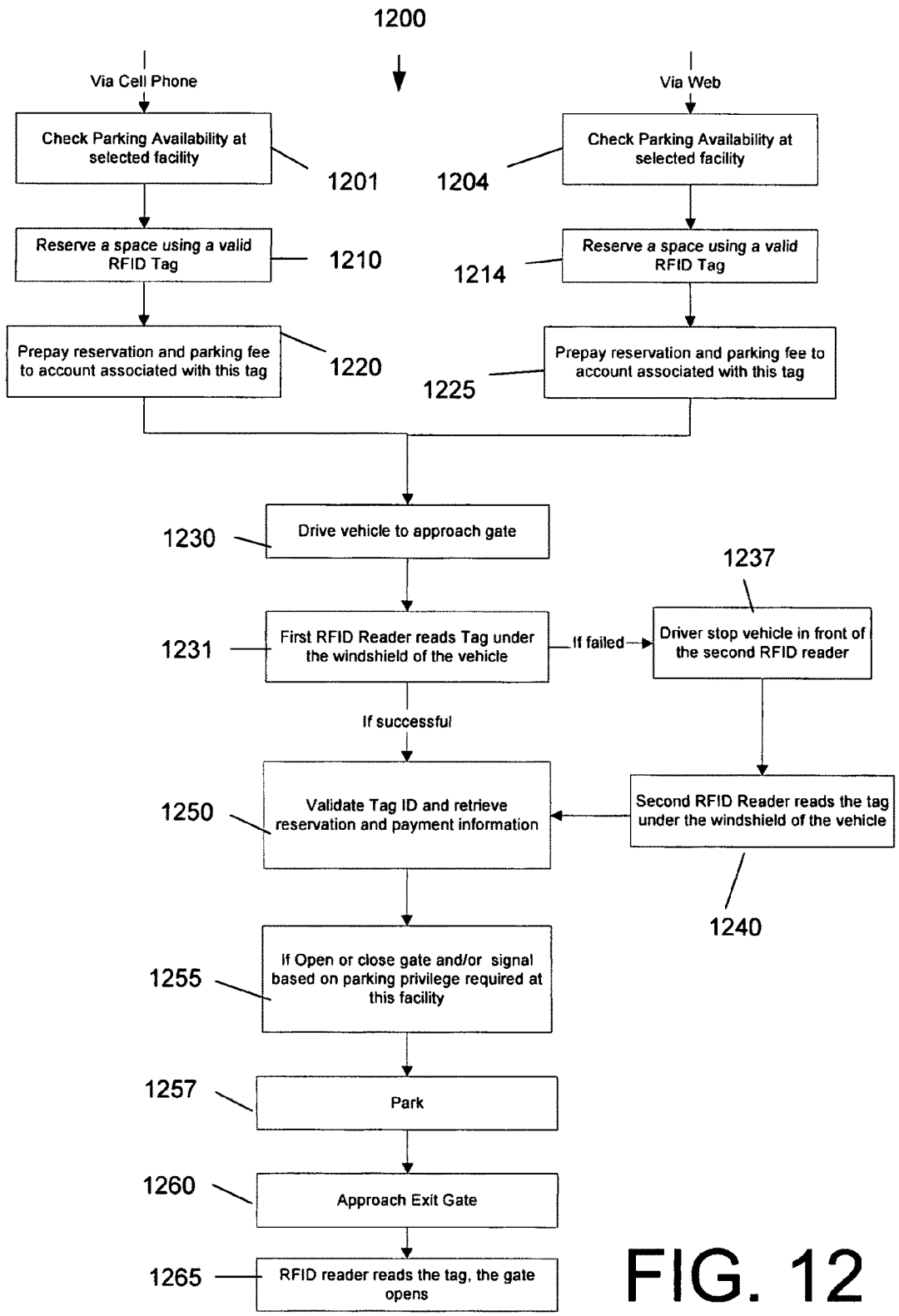
FIG. 12 is an exemplary process for use with the system of FIG. 11.

FIG. 12 shows a workflow diagram 1200 for public parking by returning patrons for use with the system of FIG. 11. Since the driver in this embodiment is returning to the facility and already has an RFID tag associated with an account, the vehicle does not need to be registered. The central database stores the information for all valid RFID tags that have been issued by the parking facility. Before or during a trip to the facility, the driver may check parking availability via the user interface, such as a web browser connected to the server via the Internet 1201 or a cell phone 1204 connected to an automated call receiving system connected to the server to make a reservation if the facility has sufficient space. If there is space, the driver may reserve a space using a valid ID associated with an RFID tag 1210, 1214. Payment for the reservation may be charged to the account associated with the issued RFID tag stored in the central database 1220, 1225.

In one embodiment, the reservation unit 150 may implement a bidding or a reverse auction application. In this example, a driver bids for an available parking space or the driver submits a price they are willing to pay for a parking space. If the auction is won or the price is accepted, the driver is awarded a space. Additionally, a reserve price may be used to set a minimum price for the parking space. A set price, or a buy-now price, may be implemented to allow a user to purchase an available space at the specified price without bidding.

Once the space has been reserved, the driver proceeds to the entrance of the parking facility where the primary antenna attempts to read the ID associated with the RFID tag of the vehicle 1231. If the primary antenna fails to read the RFID tag, the vehicle may slow and/or stop before the gate 1237 to allow the secondary antenna to read the RFID tag 1240. Once the RFID tag is read the RFID reader determines the ID associated with the RFID tag and supplies the ID to the control station. The control station sends the ID to the server computer to determine if the ID is valid and stored in the central database 1250. If the ID is determined to be valid, the server instructs the control station to command the gate controller to open the gate 1251.

In another example, if a driver does not have an RFID tag, the driver may still reserve a parking space. In this case the driver must create an account using a user interface connected to the server. The server takes the driver information and creates the account. The driver then must make a successful payment transaction for the reservation using the user interface via bidding or paying the set price, as described above. If successful, the user is issued a reservation number that may be associated with the account storing the reservation and payment information. As returning patrons with a tag, the user is guaranteed a parking space with this reservation number. As the user approaches the gate of the parking facility, the user enters the reservation number via a data entry device, such as a keypad provided at the entrance of the facility. The reservation number is supplied to the control station to retrieve the reserved parking space information and payment information stored in the account of the central database. The driver is then issued a ticket with an embedded RFID tag from a ticket dispenser. The driver places the RFID tag in the vehicle and proceeds to the entrance to allow the primary or secondary antenna 240 to read the RFID tag and open the gate as described above. The driver parks the vehicle in the reserved parking space 1257.

When leaving the facility, as the vehicle approaches the exit 1260, a primary antenna attempts to read the ID associated with the RFID in his vehicle. If the primary antenna is unable to read the RFID tag, the vehicle may slow and/or stop before the exit gate to allow the secondary antenna to read the RFID tag. Once the ID is determined, the reader supplies the determined ID to the control station. The control station sends the ID to the server computer to access the payment system. The payment system may automatically deduct the fee associated with parking at the facility from the account associated with the ID. If the account has sufficient funds, the server instructs the control station to command the gate controller to open the gate and let the vehicle exit without stopping 1265. The driver may use the same tag upon visiting any of the facilities managed by the system in the future (without having to receive a newly dispensed RFID tag). If it is determined that the account has insufficient funds, the driver may be asked to return the tag for reuse and the gate is then opened.

A number of exemplary implementations have been described. Nevertheless, it will be understood that various modifications may be made. For example, suitable results may be achieved if the steps of described techniques are performed in a different order and/or if components in a described system, architecture, device, or circuit are combined in a different manner and/or replaced or supplemented by other components. Accordingly, other implementations are within the scope of the following claims.

What is claimed is:

1. A radio frequency identification (RFID) based parking system to control at least one gate configured to allow a patron in a vehicle to enter or exit a parking facility without stopping, the system comprising:
   a first antenna configured to read a passive RFID tag in a first area within a lane associated with an entrance or an exit of the parking facility, wherein the first antenna and the corresponding first area are positioned to minimize false readings of RFID tags of other vehicles entering or exiting the parking facility and to allow the vehicle to enter or exit the parking facility without stopping;
   a second antenna configured to read the passive RFID tag in a second area, separate from the first area, contained within the lane associated with the entrance or exit, wherein the second antenna and the corresponding second area are positioned to read the passive RFID tag when the first antenna fails to read the RFID tag to allow the vehicle to enter or exit the parking facility;
   a first detector to detect the vehicle entering the first area;
   a second detector to detect the vehicle entering the first area;
   a passive RFID reader connected to the first and second antennae configured to sequentially activate the first antenna when the vehicle enters the first area and deactivate the first antenna and activate the second antenna when the vehicle enters the second area to read an identification (ID) associated with the passive RFID tag when the passive RFID tag passes through one of the first and second areas to allow the vehicle to enter or exit the parking facility without stopping;
   a processing device configured to determine that the read ID is valid and may access the facility and configured to control the gate to open;
   wherein D, a distance in feet along a horizontal axis from the gate to an edge of the first area farthest from the gate, is selected to allow the vehicle to enter or exit the parking facility without stopping and is determined as the sum of D1 the distance in feet along the horizontal axis from the gate to the second detector and D2 the distance in feet along the same horizontal axis from the second detector to the first detector and D is expressed as:
   $D=D1+D2=2\times MPH+(MPH)^2/5$ where MPH is the speed limit in miles per hour in the lane at the gate.

2. The system of claim 1 wherein the first detector is positioned in the lane approximately at an edge of the first area farthest from the gate, and the second detector is positioned in the lane at an edge of the first area close to the gate.

3. The system of claim 2 further comprising:
   a third detector, to detect the vehicle, positioned in the lane after the gate wherein the RFID reader deactivates the second antenna and closes the gate when the vehicle is detected by the third detector.

4. The system of claim 1 wherein the first antenna is disposed above the lane and the first area extends generally from the first detector to the second detector.

5. The system of claim 1 wherein the first antenna is linearly polarized and the second antenna is circularly polarized.

6. The system of claim 1 further comprising:
   a registration unit to obtain information about a user of the parking facility for storage in a database corresponding to the ID associated with the RFID tag.

7. The system of claim 1 further comprising:
   a payment unit to receive payment with regard to an account associated with a specific RFID tag ID.

8. The system of claim 1 further comprising:
   a driver information unit to provide real time parking availability information for the parking facility.

9. The system of claim 8 wherein the driver information unit may include a remote interface to present the real time parking space availability information and other parking facility information.

10. The system of claim 9 wherein the remote interface sends the real time parking availability information to a remote processing device at specified times.

11. The system of claim 10 wherein the parking information is a text message including the real time parking availability information.

12. The system of claim 1 further comprising:
   a reservation unit to reserve a parking space remotely before arriving at the facility.

13. The system of claim 12 wherein the reservation unit provides a user interface to allow a user to check parking availability at the facility, to make payment, and to reserve a parking space.

14. The system of claim 12 wherein the reservation unit provides an online auction to receive bids for an available parking space and award the parking space to the highest bidder.

15. The system of claim 1 further comprising a database in communication with the processing device to store information of a user associated with the RFID tag including real time transaction data.

16. A radio frequency identification (RFID) based parking system to control at least one gate configured to allow a patron in a vehicle to enter or exit a parking facility without stopping the system comprising:
- a first antenna configured to read an RFID tag in a first area within a lane associated with an entrance or an exit of the parking facility;
- a second antenna configured to read the RFID tag in a second area, separate from the first area, contained within the lane associated with the entrance or exit;
- an RFID reader connected to the first and second antennae configured to read an identification (ID) associated with the RFID tag when the RFID tag passes through one of the first and second areas;
- a processing device configured to determine that the read ID is valid and may access the facility and configured to control the gate to open;
- a first detector to detect the vehicle entering the first area, and
- a second detector to detect the vehicle entering the second area, wherein the RFID reader activates the first antenna to read the RFID tag in the first area when the vehicle is detected by the first detector; deactivates the first antenna and activates the second antenna to read the RFID tag in the second area when the vehicle is detected by the second detector, and
- wherein D a distance in feet along a horizontal axis from the gate to an edge of the first area farthest from the gate the sum of D1 the distance in feet along a horizontal axis from the gate to the second detector and D2 the distance in feet along the same horizontal axis from the second detector to the first detector and D is expressed as:
- $D=D1+D2=2\times MPH+(MPH)^2/5$ where MPH is the speed limit in miles per hour in the lane at the gate.

* * * * *